US008178207B2

United States Patent
Mizuno et al.

(10) Patent No.: US 8,178,207 B2
(45) Date of Patent: May 15, 2012

(54) SILICONE-BASED PRESSURE-SENSITIVE ADHESIVE COMPOSITION AND ADHESIVE TAPE

(75) Inventors: Haruna Mizuno, Chiba (JP); Seiji Hori, Chiba (JP); Takateru Yamada, Ichihara (JP)

(73) Assignee: Dow Corning Toray Company, Ltd., Tokyo (JP)

( * ) Notice: Subject to any disclaimer, the term of this patent is extended or adjusted under 35 U.S.C. 154(b) by 64 days.

(21) Appl. No.: 12/520,604

(22) PCT Filed: Dec. 20, 2007

(86) PCT No.: PCT/JP2007/075236
§ 371 (c)(1),
(2), (4) Date: Mar. 3, 2010

(87) PCT Pub. No.: WO2008/081913
PCT Pub. Date: Jul. 10, 2008

(65) Prior Publication Data
US 2010/0168313 A1    Jul. 1, 2010

(30) Foreign Application Priority Data

Dec. 25, 2006   (JP) ................................ 2006-347680

(51) Int. Cl.
*B32B 9/06* (2006.01)
*C08F 283/12* (2006.01)

(52) U.S. Cl. ........................................ 428/447; 525/478

(58) Field of Classification Search .................. 428/447
See application file for complete search history.

(56) References Cited

U.S. PATENT DOCUMENTS

| | | | | |
|---|---|---|---|---|
| 2,779,776 A | * | 1/1957 | Hyde et al. ..................... 556/452 |
| 2,814,601 A | * | 11/1957 | Currie et al. ..................... 528/18 |
| 4,460,371 A | * | 7/1984 | Abber ........................... 424/448 |
| 5,190,827 A | * | 3/1993 | Lin ............................... 428/447 |
| 5,216,069 A | * | 6/1993 | Kobori ........................... 524/588 |
| 5,254,644 A | | 10/1993 | Kobori et al. |
| 5,576,110 A | * | 11/1996 | Lin et al. ........................ 428/447 |
| 5,580,915 A | * | 12/1996 | Lin ................................. 524/267 |
| 6,387,487 B1 | * | 5/2002 | Greenberg et al. ......... 428/355 R |
| 2004/0157064 A1 | | 8/2004 | Aoki |
| 2006/0172140 A1 | | 8/2006 | Kuroda et al. |

FOREIGN PATENT DOCUMENTS

| | | |
|---|---|---|
| EP | 1295927 A1 | 3/2003 |
| JP | 63-022886 A | 1/1988 |
| JP | 4-335083 A | 11/1992 |
| JP | 10-110156 A | 4/1998 |
| JP | 2002-275450 | 9/2002 |
| JP | 2006-213810 A | 8/2006 |

OTHER PUBLICATIONS

Gelest, Reactive Silicones: forging new polymer links, 2005, 3 pages.*
English language abstract for JP 63-022886 extracted from espacenet.com database, dated Oct. 19, 2009, 8 pages.
English language abstract for JP 04-335083 extracted from espacenet.com database, dated Oct. 19, 2009, 8 pages.
English language translation and abstract for JP 10-110156 extracted from PAJ database, dated Oct. 19, 2009, 52 pages.
English language translation and abstract for JP 2002-275450 extracted from PAJ database, dated Oct. 19, 2009, 33 pages.
English language translation and abstract for JP 2006-213810 extracted from PAJ database, dated Oct. 19, 2009, 62 pages.
PCT International Search Report for PCT/JP20071075236, dated Apr. 10, 2008, 4 pages.

* cited by examiner

*Primary Examiner* — Robert Loewe
(74) *Attorney, Agent, or Firm* — Howard & Howard Attorneys PLLC

(57) ABSTRACT

A silicone-based pressure-sensitive adhesive composition comprising (A) a condensation-reaction product obtained by subjecting a diorganopolysiloxane having silanol groups on both molecular terminals and 2 or more silicon-bonded alkenyl groups located in side molecular chains in one molecule (a) and organopolysiloxane resin having one or more hydrolyzable groups in one molecule (b) to a condensation reaction in the presence of catalyst (c), (B) an organohydrogenpolysiloxane, (C) a diorganopolysiloxane having silicon-bonded alkenyl groups on both molecular terminals, (D) an organopolysiloxane resin and (E) a platinum catalyst.

12 Claims, No Drawings

US 8,178,207 B2

SILICONE-BASED PRESSURE-SENSITIVE ADHESIVE COMPOSITION AND ADHESIVE TAPE

RELATED APPLICATIONS

This application claims priority to and all the advantages of International Patent Application No. PCT/JP2007/075236, filed on Dec. 20, 2007, which claims priority to Japanese Patent Application No. JP 2006-347680, filed on Dec. 25, 2006.

TECHNICAL FIELD

The present invention relates to a silicone-based pressure-sensitive adhesive composition with super-low silicone-transfer properties, which, even after being exposed to a high temperature, is capable of maintaining excellent adhesion, prevents almost perfectly generation of adhesive residues and silicone components on the adherend after peeling off. The invention also relates to an adhesive tape that uses the aforementioned silicone-based pressure-sensitive adhesive composition.

BACKGROUND ART

As compared to an acrylic-based or a rubber-based pressure-sensitive adhesive composition, silicone-based pressure-sensitive adhesive compositions are superior to the former in their electric-insulating, heat-resistant, weatherproof properties and adhesion to various substrates. Therefore silicone-based pressure-sensitive adhesive compositions find application in the structure of heat-resistant tapes, insulating tapes, heat-seal tapes, masking tapes for electroplating, masking tapes for heat treatment, etc. Depending on the mechanism of curing, the aforementioned silicone-based pressure-sensitive adhesive compositions can be divided into compositions cured by means of an addition reaction, compositions cured by a condensation reaction, or compositions cured by means of peroxides. From the viewpoint of curing properties, most preferable are compositions curable by means of an addition reaction.

Japan Patent Publication S63-22886 (Patent Reference 1) disclose that addition reaction-curable silicone-based pressure-sensitive adhesive compositions that consists of a diorganopolysiloxane having silicon-bonded alkenyl groups on both molecular terminals, an organopolysiloxane resin composed of $R_3SiO_{1/2}$ units (where R designates an alkyl group, an alkenyl group, or a hydroxyl group) and $SiO_{4/2}$ units, an organopolysiloxane having in one molecule at least two silicon-bonded hydrogen atoms, a platinum-type catalyst, and an organic solvent.

However, adhesive tapes made with the use of the silicone-based pressure-sensitive adhesive composition disclosed in Patent Reference 1 are subject to delamination under the effect of heat and leave adhesive residues after peeling off from various adherends. Therefore, various silicone-based adhesive compositions have been proposed in order to solve both problems by increasing the adhesion force and at the same time reducing transfer of adhesive residue when the tape is used at high temperatures.

For example, Japan Patent Publication H04-335083 (Patent Reference 2) discloses a silicone-based adhesive composition that comprises an organopolysiloxane that contains vinyl groups and has a degree of polymerization equal to or greater than 2000, an organopolysiloxane resin composed of $R_3SiO_{1/2}$ units (where R designates a monovalent hydrocarbon group or a hydroxyl group) and $SiO_{4/2}$ units), an organohydrogenpolysiloxane, a platinum-type catalyst, and a polysiloxane that contains vinyl groups and has a degree of polymerization equal to or lower than 2000. Same Patent Reference 2 discloses a method of preparation of the silicone-based adhesive composition by stirring under heating conditions a dimethylpolysiloxane having both terminals capped with hydroxy groups, an organopolysiloxane, and a methylpolysiloxane resin composed of $Me_3SiO_{1/2}$ and $SiO_{4/2}$ units in toluene, then adding the remaining components, and mixing the entire composition (see Patent Reference 2, Practical Example 2).

Japan Patent Publication H10-110156 (Patent Reference 3) descloses a silicone-based pressure-sensitive adhesive agent comprising a product of partial condensation of a crude rubber-like organopolysiloxane containing in one molecule on average (a) one or more alkenyl groups and (b) an organopolysiloxane resin consisting substantially of $R_3SiO_{1/2}$ units (where R represents a monovalent hydrocarbon group) and $SiO_{4/2}$ units, an organohydrogenpolysiloxane, and a platinum-based catalyst. The aforementioned composition is prepared by subjecting a crude rubber-like copolymer of a methylvinylpolysiloxane and dimethylsiloxane having both molecular terminals capped with silicon-bonded hydroxyl groups and a methylpolysiloxane resin consisting of $SiO_{4/2}$ units and $Me_3SiO_{1/2}$ units containing 2.0 wt. % of silicon-bonded hydroxyl groups to a condensation reaction in xylene and in the presence of methylamine and then adding the remaining components to the obtained reaction product (see Patent Reference 3, Practical Example 1).

On the other hand, Japan Patent Publication 2002-275450 (Patent Reference 4) discloses a silicone-based pressure-sensitive adhesive composition comprising a cross-linked structure of a compound containing a silicone rubber and a silicone resin as main components. The silicone-based pressure-sensitive composition is characterized in that the gel fraction of the silicone-based pressure-sensitive adhesive composition rises in a range of 5-55 wt. % when heating of the adhesive composition is kept at 200° C. for 24 hr. The aforementioned silicone-based pressure-sensitive adhesive composition is prepared by stirring under heating conditions a crude rubber-like dimethylpolysiloxane and a methylpolysiloxane resin consisting of $SiO_{4/2}$ units and $Me_3SiO_{1/2}$ units in toluene, then adding the remaining components, and further mixing the obtained mixture (Patent Reference 4, Practical Example 1).

Japan Patent Publication 2006-213810 (Patent Reference 5) also discloses an adhesive silicone composition that possesses excellent peel-off properties and does not leave adhesive residue even when used at a high temperature of 250° C. or higher. The composition is prepared by obtaining a reaction mixture from a polyorganosiloxane having in one molecule more than 2 alkenyl groups and a polyorganosiloxane consisting of $SiO_2$ units and $R^1_3SiO_{0.5}$ units (where $R^1$ designates monovalent hydrocarbon groups that may be the same or different and that contain 1 to 10 carbon atoms), and then combining the obtained mixture with a polyorganosiloxane having SiH groups, an inhibitor, and a platinum-based catalyst. An adhesive tape produced by curing the aforementioned composition on a substrate has also been disclosed.

It is known that the adhesive tape having an adhesive layer made from the aforementioned silicone-based pressure-sensitive adhesive composition provides high bonding/adhesive force and, to some extent, prevents the transfer of adhesive components to the substrate even when the tape is used during heat treatment at temperatures exceeding 200° C.

However, when these known adhesive tapes having the silicone-based pressure-sensitive adhesive layer is used for its heat-resistant properties and after the tape is peeled off, a residual microscopic amount of silicone can still be visually observed on the substrate surface, and an additional operation of cleaning the surface with an organic solvent becomes indispensable. Therefore, there was a demand for developing a pressure-sensitive adhesive that would leave a practically invisible amount of residual silicone component on the surface of a substrate so that it would be possible to eliminate the need for cleaning the substrate surface with an organic solvent, in particular when the aforementioned tape is used as a masking tape during a heat-treatment operation in solder reflow treatment of circuit boards.

With use of the silicone-based pressure-sensitive adhesive compositions disclosed in the aforementioned patent literature, it was impossible to limit development of the residual adhesive on the surface of the adherend after holding in a high-temperature environment at temperatures equal to or exceeding 250° C. and to get rid of the subsequent cleaning of the surface of the adherend with an organic solvent to an extent such that it would be possible to prevent discoloration of the surface of the adherend and to completely eliminate existence of the residual silicone on the adherend's surface.

Furthermore, above Patent References 1 through 5 do not teach the combined use of the following components: a condensation-reaction product between organopolysiloxane resin and organopolysiloxane having a high degree of polymerization; a non-reacted organopolysiloxane resin having a high degree of polymerization; and a non-reacted organopolysiloxane resin. Thus, it was not known that a silicone-based pressure-sensitive adhesive composition obtained by combining such condensation-reaction product with non-reacted organopolysiloxane and organopolysiloxane resin would almost completely prevent the generation of adhesive residue on the adherend's surface after peeling of the tape from it and would prevent transfer of the silicone components to the surface of the adherend.

DISCLOSURE OF INVENTION

It is an object of the invention to provide a silicone-based pressure-sensitive adhesive composition giving a pressure-sensitive adhesive layer with super-low silicone-transfer property that no adhesive residue can be detected by human eyes and does not transfer a silicone component even if it is exposed to heat treatment at a temperature equal to or greater than 250° C. It is another object to provide an adhesive tape based on the aforementioned adhesive composition, in particular a masking tape for use in heat treatment processes.

Theses problems of the prior arts can be solved by means of a silicone-based pressure-sensitive adhesive composition comprising of components (A) through (E) given in below, and by means of an adhesive tape having a pressure-sensitive adhesive layer obtained by curing the aforementioned silicone-based pressure-sensitive adhesive composition:

(A) a condensation-reaction product obtained by subjecting constituents (a) and (b) given below to a condensation reaction in the presence of constituent (c), wherein:

constituent (a) is used in the amount of 10 parts by weight and comprises a diorganopolysiloxane having silanol groups on both molecular terminals and 2 or more silicon-bonded alkenyl groups located in side molecular chains on average in one molecule represented by general formula (1):

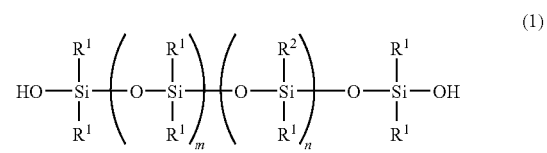

(where $R^1$ designates a non-substituted or substituted monovalent saturated hydrocarbon group, $R^2$ designates an alkenyl group having 2 to 10 carbon atoms, "m" is an integer equal to or greater than 2000, and "n" is an integer equal to or greater than 2);

constituent (b) is used in the amount of 1 to 30 parts by weight and comprises an organopolysiloxane resin having one or more hydrolyzable groups in one molecule and consisting essentially of $XR^3{}_2SiO_{1/2}$ units (where X stands for an OH group and a hydrolyzable group selected from alkoxy groups having 2 to 6 carbon atoms, and $R^3$ may independently designate non-substituted or substituted monovalent hydrocarbon groups having 1 to 10 carbon atoms), $R^3{}_3SiO_{1/2}$ units (wherein $R^3$ are the same as defined above), and $SiO_{4/2}$ units;

constituent (c) is a condensation catalyst used in a catalytic quantity;

(B) an organohydrogenpolysiloxane represented by the general formula (2):

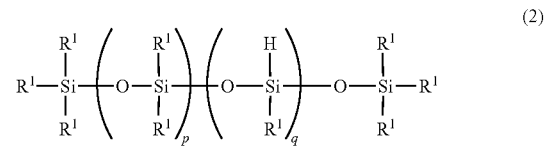

(wherein $R^1$ designates a non-substituted or substituted saturated monovalent hydrocarbon group, "p" is a positive integer, "q" is an integer equal to or greater than 2, and where "p" and "q" satisfy the following condition: $10 \leq (p+q) \leq 200$);

(C) a diorganopolysiloxane having silicon-bonded alkenyl groups on both molecular terminals represented by the general formula (3):

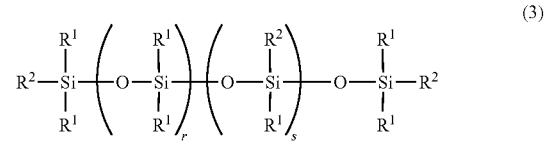

(wherein $R^1$ designates a non-substituted or substituted saturated monovalent hydrocarbon group, $R^2$ designates an alkenyl group with 2 to 10 carbon atoms, "r" designates an integer equal to or greater than 2000, and "s" designates 0 or a positive integer);

(D) an organopolysiloxane resin consisting essentially of $R^4{}_3SiO_{1/2}$ units (where $R^4$ designates a group selected from a non-substituted or substituted monovalent hydrocarbon group, an OH group, or an alkoxy group having 2 to 6 carbon atoms, and where 90% or more of groups designated by $R^4$ are non-substituted or substituted monovalent hydrocarbon groups having 1 to 10 carbon atoms) and $SiO_{4/2}$ units; and (E) a platinum catalyst.

More specifically, the invention provides:

[1] A silicone-based pressure-sensitive adhesive composition comprising components (A) through (E), wherein:

(A) a condensation-reaction product obtained by subjecting constituents (a) and (b) given below to a condensation reaction in the presence of constituent (c), wherein:

constituent (a) is used in the amount of 10 parts by weight and comprises a diorganopolysiloxane having silanol groups on both molecular terminals and on average 2 or more silicon-bonded alkenyl groups located in side molecular chains in one molecule, represented by general formula (1):

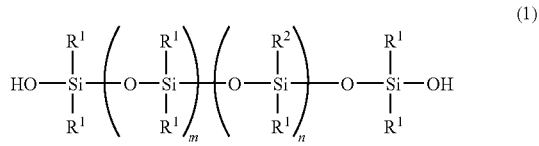

(1)

(where $R^1$ designates a non-substituted or substituted monovalent saturated hydrocarbon group, $R^2$ designates an alkenyl group having 2 to 10 carbon atoms, "m" is an integer equal to or greater than 2000, and "n" is an integer equal to or greater than 2);

constituent (b) is used in the amount of 1 to 30 parts by weight and comprises an organopolysiloxane resin having one or more hydrolyzable groups in one molecule and consisting essentially of $XR^3{}_2SiO_{1/2}$ units (where X stands for an OH group and a hydrolyzable group selected from alkoxy groups having 2 to 6 carbon atoms, and $R^3$ may independently designate non-substituted or substituted monovalent hydrocarbon groups having 1 to 10 carbon atoms), $R^3{}_3SiO_{1/2}$ units (wherein $R^3$ are the same as defined above), and $SiO_{4/2}$ units;

constituent (c) is a condensation catalyst used in a catalytic quantity;

(B) an organohydrogenpolysiloxane represented by the general formula (2):

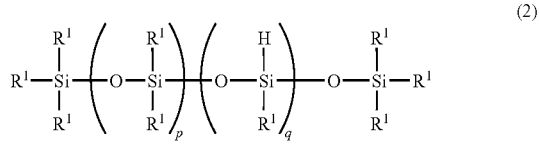

(2)

(wherein $R^1$ designates a non-substituted or substituted saturated monovalent hydrocarbon group, "p" is a positive integer, "q" is an integer equal to or greater than 2, and where "p" and "q" satisfy the following condition: $10 \leq (p+q) \leq 200$);

(C) a diorganopolysiloxane having silicon-bonded alkenyl groups on both molecular terminals, represented by the general formula (3):

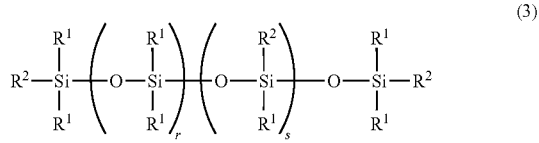

(3)

(wherein $R^1$ designates a non-substituted or substituted saturated monovalent hydrocarbon group, $R^2$ designates an alkenyl group with 2 to 10 carbon atoms, "r" designates an integer equal to or greater than 2000, and "s" designates 0 or a positive integer);

(D) an organopolysiloxane resin consisting essentially of $R^4{}_3SiO_{1/2}$ units (where $R^4$ designates a group selected from a non-substituted or substituted monovalent hydrocarbon group, an OH group, or an alkoxy group having 2 to 6 carbon atoms, and where 90% or more of groups designated by $R^4$ are non-substituted or substituted monovalent hydrocarbon groups having 1 to 10 carbon atoms) and $SiO_{4/2}$ units; and (E) a platinum catalyst.

[2] The silicone-based pressure-sensitive adhesive composition of Item [1], wherein aforementioned components (A) through (E) are used in the following amounts per 100 parts by weight of component (A):

component (B): in the amount sufficient for providing 2 to 50 silicon-bonded hydrogen atoms per 1 silicon-bonded alkenyl group out of all silicon-bonded alkenyl groups present in the composition;

component (C): in the amount of 400 to 2000 parts by weight;

component (D): in the amount of 50 to 1000 parts by weight; and component (E): in the amount that in terms of weight units provides the content of metallic platinum in this component in the range 1 to 1000 ppm per total weight of components (A) through (D).

[3] The silicone-based pressure-sensitive adhesive composition of Item [1], wherein "m" and n" are numbers that satisfy the following condition: $0.0002 \leq n/(m+n) \leq 0.02$ in formula (1) that represents a diorganopolysiloxane of constituent (a).

[4] The silicone-based pressure-sensitive adhesive composition of Item [1], wherein "r" and "s" are numbers that satisfy the following condition: $0.0002 \leq (s+2)/(r+s+2) \leq 0.02$ in formula (3) that represents a diorganopolysiloxane of component (C).

[5] The silicone-based pressure-sensitive adhesive composition of Item [1], wherein aforementioned component (D) is an organopolysiloxane resin consisting essentially of $R^5{}_3SiO_{1/2}$ units (where $R^5$ designates an alkyl group with 1 to 10 carbon atoms) and $SiO_{4/2}$ units and wherein the ratio of the $SiO_{4/2}$ units to $R^5{}_3SiO_{1/2}$ units is in the range of 0.6 to 1.0.

[6] The silicone-based pressure-sensitive adhesive composition according to any Item from [1] to [5], further comprising an organic solvent (F).

[7] An adhesive tape having a pressure-sensitive adhesive layer obtained by curing the silicone-based pressure-sensitive adhesive composition according to any Item from [1] to [6].

[8] The adhesive tape of Item [7], which is a masking tape for use in thermal treatment.

[9] The adhesive tape of Item [7], wherein the aforementioned masking tape is intended for use in treatment at temperatures in the range of 200 to 300° C.

EFFECT OF INVENTION

This invention can provide a silicone-based pressure-sensitive adhesive composition giving a pressure-sensitive adhesive layer with super-low silicone-transfer property that no adhesive residue can be detected by human eyes and does not transfer a silicone component even when it is repeeled after being exposed to heat treatment at a temperature equal to or greater than 250° C. And, this invention can provide an adhesive tape based on this composition, in particular a masking tape for use in heat treatment processes.

DETAILED DESCRIPTION OF THE INVENTION

At first, the silicone-based pressure-sensitive adhesive composition of the present invention is explained in detail.

This composition comprises components (A) through (E), as described below. More specifically, by combining component (A), which is a product of condensation, with unreacted component (C) and unreacted component (D), it becomes possible to almost completely prevent transfer of silicone components and leave almost no adhesive residue on the adherend after peeling off.

Component (A) is one of the main components of the silicone-based pressure-sensitive adhesive composition of the invention. This component is a product of condensation obtained by subjecting constituents (a) and (b), which are described below, to a condensation reaction in the presence of constituent (c):

(a) a diorganopolysiloxane having silanol groups on both molecular terminals and on average 2 or more silicon-bonded alkenyl groups located in side molecular chains in one molecule, represented by general formula (1):

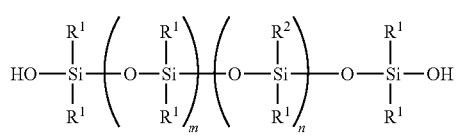

(where $R^1$ designates a non-substituted or substituted monovalent saturated hydrocarbon group, $R^2$ designates an alkenyl group having 2 to 10 carbon atoms, "m" is an integer equal to or greater than 2000, and "n" is an integer equal to or greater than 2);

constituent (b) is used in the amount of 1 to 30 parts by weight and comprises an organopolysiloxane resin having one or more hydrolyzable groups in one molecule and consisting essentially of $XR^3_2SiO_{1/2}$, units (where X stands for an OH group and a hydrolyzable group selected from alkoxy groups having 2 to 6 carbon atoms, and $R^3$ may independently designate non-substituted or substituted monovalent hydrocarbon groups having 1 to 10 carbon atoms), $R^3_3SiO_{1/2}$ units (wherein $R^3$ are the same as defined above), and $SiO_{4/2}$ units;

constituent (c) is a condensation catalyst used in a catalytic quantity

Constituent (a) is a diorganopolysiloxane represented by aforementioned general formula (1) that has hydroxyl groups on both molecular terminals and has two or more silicon-bonded alkenyl groups on average in side chains of one molecule.

In the above formula, $R^1$ designates a non-substituted or substituted saturated monovalent hydrocarbon group. Specific examples of these groups are the following: methyl, ethyl, propyl, isopropyl, butyl, isobutyl, tert-butyl, pentyl, neopentyl, hexyl, heptyl, octyl, nonyl, decyl, dodecyl, or similar alkyl groups; phenyl, tolyl, xylyl, naphthyl, biphenyl, or similar aryl groups; cyclopentyl, cyclohexyl, cycloheptyl, or similar cycloalkyl groups; benzyl, phenylethyl, phenylpropyl, methylbenzyl, or similar aralkyl groups; or the aforementioned groups wherein one or more hydrogen atoms of the saturated monovalent hydrocarbon groups is substituted with a halogen atom such as a fluorine atom, chlorine atom, bromine atom, or another halogen atom, as well as a cyano group. Examples of such [substituted] groups are the following: chloromethyl, 2-bromoethyl, 3-chloropropyl, 3,3,3-trifluoropropyl, chlorophenyl, fluorophenyl, cyanoethyl, 3,3,4,4,5,5,6,6,6-nonafluorohexyl group, etc. Most preferable from the production point of view are methyl and phenyl groups.

$R^2$ represents an alkenyl group with 2 to 10 carbon atoms. Such groups may be exemplified by vinyl, allyl, propenyl, isopropenyl, butenyl, pentenyl, hexenyl, cyclohexenyl, or similar groups. Most preferable are alkenyl groups with two to six carbon atoms, in particular, vinyl and hexenyl groups.

In the above formula, "m" is an integer equal to or greater than 2000 and designates the degree of polymerization. It is preferable that "m" be in the range of 2000 to 100,000. If the degree of polymerization "m" of constituent (a) is lower than 2000, then even if constituent (a) forms a product of polymerization with constituent (b), described below, it will not be possible to obtain a pressure-sensitive adhesive layer with sufficiently low adhesive-transfer properties. In order to provide two or more silicon-bonded alkenyl groups in side chains of constituent (a) in one molecule on average, "n", which designates the degree of polymerization, should be equal to or greater than 2. Furthermore, both degrees of polymerization "m" and "n" should satisfy the following condition: $0.0002 \leq n/(m+n) \leq 0.02$ and preferably the following condition: $0.0005 \leq n/(m+n)$ 0.005. If "n" is less than 2 and if $n/(m+n)$ is less than 0.0002, then it will be impossible to form a pressure-sensitive adhesive layer because the amount of alkenyl groups will be insufficient for involving the below-described component (C) in a hydrosilylation reaction. Furthermore, if $n/(m+n)$ is greater than 0.02, it will be impossible to form a pressure-sensitive adhesive layer or to provide strong bonding property between the pressure-sensitive adhesive layer and the surface of a substrate.

The aforementioned constituent (a) may comprise a so-called crude silicone rubber, which is an organopolysiloxane of a high degree of polymerization with a viscosity of no less than 100,000 mPa·s at 25° C. Preferably this is an organopolysiloxane of a high degree of polymerization with a viscosity in the range of 300,000 to 1,000,000 mPa·s at 25° C. or a rubber-like organopolysiloxane having a degree of plasticity in the range of 1 to 10.

Constituent (b) is an organopolysiloxane resin that consists essentially of $XR^3_2SiO_{1/2}$ units, $R^3_3SiO_{1/2}$ units, and $SiO_{4/2}$ units. This constituent contains one or more hydrolyzable groups in one molecule.

In the above formula, X is a hydrolyzable group selected from OH group or alkoxy groups having 2 to 6 carbon atoms. These groups can be exemplified by the following: silanol (with an OH group), methoxy, ethoxy, propoxy, isopropoxy, or butoxy groups. The preferable hydrolyzable groups may be silanol groups (with OH groups). It is recommended that among all functional groups, such as functional group X and functional group $R^3$ of constituent (b), the content of the aforementioned silanol groups (with OH groups) range from 0.1 to 10 mole % and, preferably, from 0.5 to 5 mole %.

$R^3$ designates a non-substituted or substituted monovalent hydrocarbon group having 1 to 10 carbon atoms independently. Specific examples of this group are the following: methyl, ethyl, propyl, isopropyl, butyl, isobutyl, tert-butyl, pentyl, neopentyl, hexyl, heptyl, octyl, nonyl, decyl, dodecyl, or a similar alkyl group; phenyl, tolyl, xylyl, naphthyl, biphenyl, or a similar aryl group; cyclopentyl, cyclohexyl, cycloheptyl, or a similar cycloalkyl group; benzyl, phenylethyl, phenylpropyl, methylbenzyl, or a similar aralkyl group; vinyl, allyl, propenyl, isopropenyl, butenyl, pentenyl, hexenyl, cyclohexenyl, or a similar alkenyl group; or the aforementioned groups wherein one or more hydrogen atoms of the monovalent hydrocarbon groups is substituted with a halogen atom such as a fluorine atom, chlorine atom, bromine atom, or another halogen atom, as well as a cyano group. Examples of such [substituted] groups are the following: chloromethyl, 2-bromoethyl, 3-chloropropyl, 3,3,3-trifluoropropyl, chlorophenyl, fluorophenyl, cyanoethyl, 3,3,4,4,5,5,6,6,6-nonafluorohexyl group, etc. Methyl groups are preferable from the production point of view. It is recommended that among all aforementioned functional groups represented by X and $R^3$ of constituent (b), the content of methyl groups range from 90 to 99.9 mole %, preferably from 95 to 99.5 mole %.

The mole ratio of the sum of $XR^3{}_2SiO_{1/2}$ and $R^3{}_3SiO_{1/2}$ units to $SiO_{4/2}$ units in the constituent (b) should be in the range of 0.5 to 1.0, preferably in the range of 0.6 to 0.9. If the mole ratio of the sum of $XR^3{}_2SiO_{1/2}$ and $R^3{}_3SiO_{1/2}$ units to $SiO_{4/2}$ units is below the recommended lower limit, the tackiness of the pressure-sensitive adhesive agent would be reduced. if the aforementioned mole ratio exceeds the recommended upper limit, there would be a tendency to reduce the cohesion force (holding strength).

When preparing component (A), it is necessary to cause a condensation reaction by using constituent (b) in an amount of 1 to 30 parts by weight per 10 parts by weight of constituent (a). If constituent (b) is used in an amount less than 1 part by weight, it will be impossible to provide sufficient adhesion of the pressure-sensitive adhesive layer obtained by curing the silicone-based pressure-sensitive adhesive composition, and if constituent (b) is used in an amount greater than 30 parts by weight, then after heat treatment, a part of constituent (b) will remain on the surface of the adherend and, therefore, the objects of the invention will not be achieved.

Constituent (c) is at least one type of condensation catalyst. The constituent (c) is added for acceleration of a condensation reaction between hydrolyzable groups of constituent (b) and silanol groups on the molecular terminals of constituent (a). It is recommended that constituent (c) comprise a condensation catalyst that is a liquid with a boiling point not exceeded 200° C. or a substance that is solid at room temperature.

There are no special restrictions with respect to constituent (c) provided that it has the aforementioned properties. One or more types of the aforementioned condensation catalyst may be selected from acidic type, basic type, organic acid metal salt types, etc. The condensation catalyst represented by constituent (c) can be selected from the following compounds: ammonia water, sodium hydroxide, barium hydroxide, amine, organic amine, or similar carboxylates, quaternary salts, carboxylic acid, or carboxylic acid metal salt. Examples of amines that can be preferably used as constituent (c) of the invention are the following amine compounds or their salts: methylamine, ethylamine, propylamine, hexylamine, butanolamine, butylamine, or similar primary amines; dimethylamine, diethylamine, diethanolamine, dipropylamine, dibutylamine, dihexylamine, ethylamylamine, imidazol, propylhexylamine, or similar secondary amines; trimethylamine, triethylamine, tripropylamine, tripropanolamine, pyridine, N-methylimidazol, methylpropylhexylamine, or similar tertiary amines; decylamine phosphate, tetramethylguanidine, or diazabicyclononane. Similarly, the following compounds are recommended for use as carboxylates of organic amines: diethylammonium acetate, butylammonium octoate, or trimethylammonium laurate. The following quaternary ammonium salts are recommended: tetramethyl acetate, methylethyldibutylammonium chloride or dioctadecyldimethylammonium chloride, and tetramethylguanidine-2-ethylhexanoate. The following carboxylic acids are recommended: acetic acid, propanoic acid, butanoic acid, formic acid, stearic acid, tetradecanoic acid, hexadecanoic acid, dodecanoic acid, decanoic acid, 3,6-dioxaheptanoic acid, or 3,6,9-trioxadecanoic acid. Furthermore, the carboxylic acid metal salts may be preferably selected from salts of lithium, sodium, potassium, cerium, or calcium. Such examples include potassium formate or potassium acetate.

Constituent (c) is used in a catalytic quantity. Normally, this quantity is in the range of 0.01 to 20 parts by weight, preferably 0.1 to 5 parts by weight per 100 parts by weight of the total amount of constituents (a) and (b). If constituent (c) is used in an amount of less than 0.01 parts by weight, this is insufficient for accelerating the condensation reaction, and if this constituent is used in an amount exceeding 20 parts by weight, some residue of the catalyst itself or components from which the catalyst originated will remain on the surface of the adherend after heat treatment. In both cases, the object of the invention will not be achieved.

Component (A) of the present invention is a condensation-reaction product obtained by reacting constituent (a) with constituent (b) in the presence of constituent (c). The aforementioned product of the condensaton reaction is obtained by stirring and mixing constituents (a), (b), and (c) at room temperature (25° C.) or at higher temperatures, e.g., 50 to 90° C. Mixing of the above constituents can be accelerated by using one or more solvents having boiling points not exceeding 200° C. Examples of such solvents are benzene, toluene, xylene, naphtha, cyclic polysiloxane, as well as alcohols such as methanol, ethanol, isopropanol, butanol, or n-propanol. When the boiling point of a solvent is below 200° C., the solvent should be used in an amount of 50 to 1,000 parts by weight per 100 parts by weight of the total amount of constituents (a) and (b). The final point of the aforementioned condensation reaction is determined by the fact that the viscosity of the condensation-reaction product becomes unchanged or changes very little after the viscosity is reached to its maximum value.

When the solvent with a boiling point below 200° C. is used, the solvent xan be removed after the component (A) was obtained as a product of the condensation reaction. Solvent-removal methods can be those known in the art. For example, removal of a solvent can be carried out by using molecular distillers, rotary distillers, or thin-film distillers. Condensation water or lower alcohols formed in the condensation reaction are also removed during the above distillation process of the solvent.

Component (B) is an organohydrogenpolysiloxane represented by general formula (2) as given below. This component is a cross-linking agent for the silicone-based pressure-sensitive adhesive composition of the invention. More specifically, a cured pressure-sensitive layer is formed by causing a hydrosilylation reaction between silicon-bonded hydrogen atoms of component (B) and alkenyl groups in components (A) and (C).

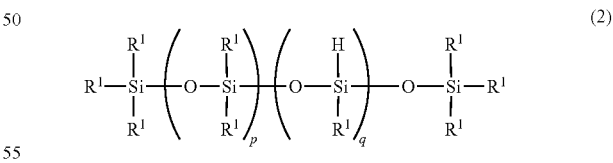

(2)

In this formula, $R^1$ designates a non-substituted or substituted saturated monovalent hydrocarbon group which can be exemplified by the same groups as defined above. In the above formula, "p" is a positive integer, "q" is an integer equal to or greater than 2, and those numbers satisfy the following condition: $10 \leq (p+q) \leq 200$. If (p+q) is below the recommended lower limit, it is difficult to provide sufficient curing due to volatility dependent on the curing conditions. If, on the other hand, (p+q) exceeds the recommended upper limit, this may cause gelling of the composition during bath aging. It is also recommended that the relationship between "p" and "q" satisfy the following condition: $3 \leq q/(p+q) < 1$. If the value of $q/(p+q)$ is below the recommended lower limit, the silicone-based pressure-sensitive adhesive composition of the invention will not cure completely.

It is recommended to use component (B) in the silicone-based pressure-sensitive adhesive composition of the invention in an amount sufficient for providing 2 to 50 silicon-bonded hydrogen atoms per 1 silicon-bonded alkenyl group out of all silicon-bonded alkenyl groups present in the composition. If the amount of silicon-bonded hydrogen atoms is less than 2 per one alkenyl group out of all silicon-bonded alkenyl groups present in the composition, this will result in incomplete curing and will form some residual adhesive on the surface of the adherend after retention under increased temperature. If, on the other hand, the amount of silicon-bonded hydrogen atoms exceeds 50 per one alkenyl group out of all silicon-bonded alkenyl groups present in the composition, this will leave some silicone residue that can be easily detected by visual observation. In order to provide super-low adhesive-transfer properties to the extent that silicone components left on the surface of the adherend are practically invisible and cannot be detected by human eyes, it is recommended to use component (B) in an amount such that the number of silicon-bonded hydrogen atoms range from 3 to 20 per one silicon-bonded alkenyl group present in the system.

Component (C) is a diorganopolysiloxane having silicon-bonded alkenyl groups on both molecular terminals, represented by general formula (3). This component imparts the excellent low adhesion-transfer properties of the silicone-based pressure-sensitive adhesive composition, when it is used in combination with component (A) and component (D).

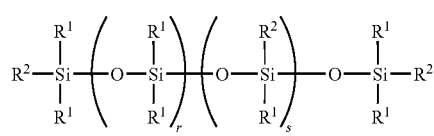
(3)

In general formula (3), $R^1$ designates a non-substituted or substituted saturated hydrocarbon group that can be exemplified by the same groups as defined above; $R^2$ designates an alkenyl group with 2 to 10 carbon atoms such as vinyl, allyl, propenyl, isopropenyl, butenyl, pentenyl, hexenyl, cyclohexenyl, or a similar group. More preferable are alkenyl groups with 2 to 6 carbon atoms and most preferable are vinyl and hexenyl groups.

In general formula (3), the degree of polymerization designated by "r" is an integer equal to or greater than 2,000, preferably in the range of 2,000 to 100,000. If the degree of polymerization designated by "r" is below 2,000, it will be practically impossible to impart sufficiently low adhesive-transfer properties in the obtained pressure-sensitive adhesive layer. Furthermore, the degree of polymerization designated by "s" is 0 or a positive integer, and the values of "r" and "s" should satisfy the following condition: $0.0002 \leq (s+2)/(r+s+2) \leq 0.02$ and preferably the following condition: $0.0005 \leq (s+2)/(r+s+2) \leq 0.005$. If the value of $(s+2)/(r+s+2)$ is less than the recommended lower limit, it will be insufficient for involving alkenyl groups in a hydrosilylation reaction with component (C) and the pressure-sensitive adhesive layer cannot be formed sufficiently. If, on the other hand, the value of $(s+2)/(r+s+2)$ is greater than the recommended upper limit, the stable pressure-sensitive adhesive layer cannot be sufficiently formed or cannot be sufficiently bonded to the substrate, even if component (E), which is described below and comprises a platinum-type catalyst, is used in an appropriate amount.

In the silicone-based pressure-sensitive adhesive composition of the invention, component (C) should be used in an amount of 400 to 2,000 parts by weight, preferably 500 to 1,000 parts by weight per 100 parts by weight of component (A). If component (C) is used in an amount less than the recommended lower limit or greater than the recommended upper limit, the low adhesive-transfer properties of this invention will not be achieved sufficiently.

Component (D) is an organopolysiloxane resin composed essentially of $R^4{}_3SiO_{1/2}$ units and $SiO_{4/2}$ units, where $R^4$ designates a group selected from a non-substituted or substituted monovalent hydrocarbon group having 1 to 10 carbon atoms, an OH group, or an alkoxy group having 2 to 6 carbon atoms, and where 90% or more of groups designated by $R^4$ are non-substituted or substituted monovalent hydrocarbon groups having 1 to 10 carbon atoms. The following are examples of groups designed by $R^4$: methyl, ethyl, propyl, isopropyl, butyl, isobutyl, tert-butyl, pentyl, neopentyl, hexyl, heptyl, octyl, nonyl, decyl, dodecyl, or similar alkyl groups; phenyl, tolyl, xylyl, naphthyl, biphenyl, or similar aryl groups; cyclopentyl, cyclohexyl, cycloheptyl, or similar cycloalkyl groups; benzyl, phenylethyl, phenylpropyl, methylbenzyl, or similar aralkyl groups; vinyl, allyl, propenyl, isopropenyl, butenyl, pentenyl, hexenyl, cyclohexenyl, or similar alkenyl groups; or the aforementioned univalent hydrocarbon groups, one or more hydrogen atoms of which are substituted with fluorine, chlorine, bromine, or a similar halogen atom, or with a cyan group. Examples of such substituted groups are the following: chloromethyl, 2-bromoethyl, 3-chloropropyl, 3,3,3-trifluoropropyl, chlorophenyl, fluorophenyl, cyanoethyl, 3,3,4,4,5,5,6,6,6-nonafluorohexyl group; a silanol group (with an OH group), methoxy, ethoxy, propoxy, isopropoxy, or a butoxy group.

From the viewpoint of lower transfer of adhesive from the pressure-sensitive adhesive layer formed by curing the composition of the invention, it is required that 90 or more mole % of groups designated by $R^4$ comprise non-substituted or substituted monovalent hydrocarbon groups having 1 to 10 carbon atoms. It is recommended that 95 to 100 mole % of groups designated by $R^4$ comprise alkyl groups with 1 to 6 carbon atoms or phenyl groups. It is preferable that 95 to 100 mole % of groups designated by $R^4$ comprise methyl groups. The mole ratio of $R^4{}_3SiO_{1/2}$ units to $SiO_{4/2}$ units that form component (D) should be in the range of 0.5 to 1.0, preferably in the range of 0.6 to 0.9. If the aforementioned ratio is below the recommended lower limit, this will reduce adhesive force developed by the pressure-sensitive adhesive composition, and if, on the other hand, the aforementioned ratio exceeds the recommended upper limit, there would be a tendency to reduce the cohesion force (holding strength).

It is preferable to use component (D) in the silicone-based pressure-sensitive adhesive composition of the invention in the amount of 50 to 1,000 parts by weight, more preferably 100 to 600 parts by weight per 100 parts by weight of component (A). If component (D) is used in an amount less than the recommended lower limit or greater than the recommended upper limit, there may be cases when it will be practically impossible to provide the pressure-sensitive adhesive layer formed by curing the silicone-based pressure-sensitive adhesive composition of the invention with sufficiently low adhesive-transfer properties, and, therefore, the object of the invention will not be achieved.

Component (E) is a platinum catalyst that accelerates the hydrosilylation reaction between silicon-bonded alkenyl groups and silicon-bonded hydrogen atoms present in the system. The following are examples of preferred platinum catalysts: chloroplatinic acid, alcohol-modified chloroplatinic acid, olefin complex of chloroplatinic acid, ketone complexes of chloroplatinic acid, vinylsiloxane complexes of chloroplatinic acid, vinylsiloxane complex of chloroplatinic acid, platinum tetrachloride, fine platinum powder, solid platinum on an alumina or silica carrier, platinum black, olefin complex of platinum, alkenylsiloxane complex of platinum, carbonyl complex of platinum, a platinum-type catalyst mixed with a powder of a thermoplastic organic resin such as methylmethacrylate resin, polycarbonate resin, polystyrene resin, siloxane resin, etc.

In the composition of the invention, component (E) should be used in an amount such that in term of weight units the content of metal platinum in component (E) ranges from 1 to 1,000 ppm per total weight of components (A) through (D), preferably from 5 to 200. If component (E) is used in an amount less than the recommended lower limit, the speed of curing of the obtained silicone-based pressure-sensitive adhesive composition will be too slow or will not be accelerated at all. If, on the other hand, the content of component (E) exceeds the recommended upper limit, this may cause discoloration of the obtained silicone-based pressure-sensitive adhesive composition.

As far as purposes of the invention cannot be disturbed, the silicone-based pressure-sensitive adhesive composition may further comprise some optional components in addition to components (A) through (E). One such component is as exemplified by an organic solvent (F), a curing-reaction-adjusting agent, or other conventionally used additives.

The silicone-based pressure-sensitive adhesive composition can be mixed with or dispersed in an organic solvent (F). Such organic solvent can be represented by toluene, xylene, or a similar aromatic-type hydrocarbon solvent; hexane, octane, iso-paraffin, or a similar aliphatic-type hydrocarbon solvent; acetone, methylethylketone, methylisobutylketone, or a similar ketone-based solvent; ethyl acetate, isobutyl acetate, or a similar ester-based acetate; diisopropyl ether, 1,4-dioxane, or a similar ether-based solvent; hexamethylcyclotrisiloxane, octamethylcyclotetrasiloxane, decamethylcyclopentasiloxane, or similar cyclic polysiloxanes having a degree of polymerization ranging from 3 to 6, as well as trichloroethylene, per-chloroethylene, trifluoromethylbenzene, 1,3-bis(trifluoromethyl)benzene, methylpentafluorobenzene, or a similar halogenated hydrocarbon. Preferable are toluene, xylene, or a similar aromatic-type hydrocarbon solvent; hexane, octane, iso-paraffin, or a similar aliphatic-type hydrocarbon solvent. Most preferable is toluene or xylene. These solvents can be used in a mixture of two or more. There are no special restrictions with regards to amounts in which the aforementioned organic solvents of component (F) can be used, but, in general, it can be recommended to use them in an amount of 5 to 1,000 parts by weight per 100 parts by weight of the total amount of components (A) through (E).

An inhibitor may also be added to the composition for adjusting the rate of curing. Such inhibitors can be represented by 2-methyl-3-butyn-2-ol, 3,5-dimethyl-1-hexyn-3-ol, 3-methyl-1-penten-3-ol, 2-phenyl-3-penten-2-ol, or a similar alkyn alcohol; 3-methyl-3-penten-1-yne, 3,5-dimethyl-3-hexen-1-yne, or a similar enyne compound; 1,3,5,7-tetramethyl-1,3,5,7-tetravinyl cyclotetrasiloxane, 1,3,5,7-tetramethyl-1,3,5,7-tetrahexenyl cyclotetrasiloxane, or a similar alkenylsiloxane. Such inhibitors should be used in an amount sufficient for adjusting the speed of curing of the composition. Normally, they are added in an amount of 5 or less parts by weight per 100 parts by weight of the total content of components (A) through (E). If these inhibitors are used in an amount greater than 5 parts by weight per 100 parts by weight of the total weight of the composition, then the speed of curing of the obtained silicone-based pressure-sensitive adhesive composition will be too slow.

The silicone-based pressure-sensitive adhesive composition of the invention can also be appropriately combined with tetramethoxysilane, tetraethoxysilane, dimethyldimethoxysilane, methylphenyldimethoxysilane, methylphenyldiethoxysilane, phenyltrimethoxysilane, methyltrimethoxysilane, methyltriethoxysilane, vinyltriethoxysilane, allyltrimethoxysilane, 3-glycidoxypropyl trimethoxysilane, 3-methacryloxypropyl trimethoxysilane, or similar alkoxysilane compounds The silicone-based pressure-sensitive adhesive composition of the invention is prepared by mixing aforementioned components (A) through (E), if necessary, with one or more aforementioned arbitrary components. These components can be uniformly mixed by using known various stirrers or mixers. Mixing is carried out at a temperature ranging from 0 to 20° C. Preparation of the composition may consist of merely mixing the components without special restriction to the sequence in which the components are added. However, if the composition is not intended for immediate use directly after preparation, a mixture can be prepared only from components (A), (C), and (D) and can be stored separately from components (B) and (E) for mixing with the latter only prior to use. Storage of the mixture of components (A), (C), and (D) separately from components (B) and (E) prior to use provides excellent long-term storage stability and prevents change in the product's appearance, e.g., because of turbidity.

The pressure-sensitive adhesive layer by curing the silicone-based pressure-sensitive adhesive composition of the invention can be prepared by being applied onto a substrate and cured at room temperature or under a temperature of 50 to 200° C. by heating. The composition can be applied by gravure coater, offset coater, offset-gravure coater, roller coater, reverse-roller coater, air-knife coater, curtain coater, or a comma coater.

The following is a more detailed description of the adhesive tape of the invention. The adhesive tape of the invention is characterized with having a pressure-sensitive adhesive layer formed by curing the above-mentioned silicone-based pressure-sensitive adhesive composition of the invention on a support film substrate.

It is preferable that the support film substrate possesses high heat-resistant properties and can withstand heat treatment at a temperature equal to or greater than 200° C. Examples of materials suitable for such films are the following: polyimide (PI), polyetheretherketone (PEEK), polyethylene naphthalate (PEN), liquid-crystal polyarylate, polyamideimide (PAI), polyether sulfide (PES), or similar resin films, as well as aluminum foil, copper foil, or a similar metal foil. There is no special restriction with regard to the thickness of the film, but normally the thickness is in the range of 5 to 300 µm. Furthermore, in order to improve tight bonding of the pressure-sensitive layer to the film substrate, the film substrate may be coated with a primer, or subjected to corona-discharge treatment, etching, itro-treatment or plasma treatment.

The adhesive tape is prepared by applying the silicone-based pressure-sensitive adhesive composition of the invention onto the aforementioned film substrate, then curing the applied adhesive layer at room temperature or with heating it at a temperature in the range of 50 to 200° C., and thus to form a pressure-sensitive adhesive layer on the film substrate.

Application methods can be the same as mentioned above. Curing of the silicone-based pressure-sensitive adhesive composition by heating is preferable, and it is preferable to heat the composition at a temperature within a range of 80 to 200° C. The amount of the composition to be applied depends on a specific application, but typically after curing the thickness of the pressure-sensitive adhesive layer should be in the range of 2 to 200 μm, and for masking tape applications the thickness should range from 5 to 50 μm.

The adhesive tape of the present invention possesses excellent heat-resistant properties, prevents formation of an adhesive substance when the tape is peeled off, and almost completely eliminates transfer of the silicone component to the adherend. Therefore the adhesive tape of the invention is suitable for use as a heat-resistant tape, electrical insulation tape, heat-seal tape, masking tape for plating processes, masking tape for heat treatment, or to other similar applications. In particular, the adhesive tape of the invention is especially suitable for use as a heat-treatment masking tape or a temporary-fixing tape employed in solder-reflow processes at a temperature within a range of 200 to 300° C., preferably from 250 to 300° C.

EXAMPLES

The invention will be further described in more detail with reference to practical and comparative examples, though it should be understood that these examples should not be construed as limiting the scope of possible applications of the invention. In the examples, methods for evaluating [appearance of the compositions without components (B) and (E) before curing], the [adhesive residue and transfer of silicone components left on the substrate after exposure to high temperatures], and its [adhesive force] are described below. In the practical and comparative examples, Me designates methyl groups, and Vi designates vinyl groups. All percents (%) are wt. %.

[Appearance of the Compositions without Components (B) and (E) Before Curing]

In Practical Example 1 and in Comparative Examples 2 to 4, the compositions were prepared without component (B), which is a cross-linking agent, and without component (E), which is a platinum-type catalyst. The prepared compositions were aged for 2 weeks at 50° C. and then their appearance was evaluated by human eyes in accordance with the criteria given below.

○: transparency remains unchanged
Δ: slight turbidity is observed
X: noticeable turbidity is observed

[Adhesive Force]

The silicone-based pressure-sensitive adhesive composition is applied to a substrate made of a polyimide resin (PI) in such an amount that, after curing, the pressure-sensitive adhesive layer that is formed has a thickness of about 15 μm. The adhesive sheet is formed by heating the resulting article for 2 minutes at 180° C. Following this, the obtained adhesive sheet was placed onto a peel-off film by means of a laminator, and the laminated structure was aged in an oven for one day at 50° C. After cooling to room temperature, adhesive tapes on peel-off substrates were prepared by cutting the aged sheet into 20 mm-wide strips. The adhesive tapes were then peeled off from the peel-off substrates, and pasted to an adherend of a mirror-surface stainless-steel sheet (SUS304) by applying a 2 kg force from a rubber roller. Following this, the tape was retained on the adherend for 30 min., and then the adhesive force is measured with a tensile tester at a constant peeling rate of 300 mm/minute and a peeling angle of 180°.

[Adhesive Residue and Transfer of Silicone Components Left on the Substrate after Exposure to High Temperature]

The silicone-based pressure-sensitive adhesive composition is applied to a substrate made of a polyimide resin (PI) in such an amount that, after curing, the pressure-sensitive adhesive layer that is formed has a thickness of about 15 μm. The adhesive sheet is formed by heating the resulting article for 2 minutes at 180° C. Following this, the obtained adhesive sheet was placed onto a peel-off film by means of a laminator, and the laminated structure was aged in an oven for one day at 50° C. After cooling to room temperature, adhesive tapes on peel-off substrates were prepared by cutting the aged sheet into 20 mm-wide strips. The adhesive tapes were then peeled off from the peel-off substrates, and pasted to an adherend of a mirror-surface stainless-steel sheet (SUS304) or of gold-plated copper-coated glass epoxy resin plate by applying a 2 kg force from a rubber roller. Following this, the laminated structure of the adhered was aged in an oven for 10 min at 250° C., and then retained on the adherend for 30 min at room temperature. The adhesive residue and transfer of silicone components left on the substrate is evaluated by peeling the pasted adhesive tape off with a tensile tester at a constant peeling rate of 300 mm/minute and peeling angle of 180°. The evaluation was carried out by human eyes in accordance with the following criteria:

○: Any adhesive residue was not remained, and no traces of the adhesive silicone layer on its surface of the adherend
Δ: Any adhesive residue was not remained, and only slight traces of the adhesive silicone layer on its surface of the adherend
X: Adhesive residue was observed on its surface of the adherend Synthesis Example 1

A 5000 mL-flask equipped with a thermometer and a drainage pipe was filled with the following components:

(a) 490 g of a diorganopolysiloxane (average molecular weight=300,000; and vinyl-group content=0.08 wt. %) having silanol (OH) groups in both molecular terminals and silicon-bonded vinyl groups in side chains, which is shown by the below average structural formula:

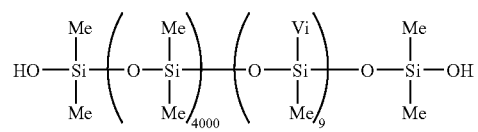

(b) 287 g of a toluene solution with 73.1 parts by weight of a solid substance of an organopolysiloxane resin (average molecular weight=4605; and OH-group content=1.11 wt. %) consisting of $Me_3SiO_{1/2}$ units, $HOMe_2SiO_{1/2}$ units, and $SiO_{4/2}$ units, which is shown by the below average structural formula:

(c) 1.75 g of a condensation catalyst containing 20% of tetramethylguanidine-2-ethylhexanoate (recalculated into a dry solids content); 36 g of xylene, and 2683 g of toluene. These components were mixed at room temperature, heated to 70° C., and then a reaction was carried out for 2 hours. Following this, the product was heated to 100° C., and after removal of condensation water, the product was cooled to room temperature to prepare a desired solution of a condensation reaction product (aforementioned component (A); 20% of a nonvolatile substance) between a diorganopolysiloxane (aforementioned constituent (a)) and an organopolysiloxane resin (aforementioned constituent (b)).

Practical Example 1

A silicone-based pressure-sensitive adhesive composition P1 with a 33 wt. % organopolysiloxane component was prepared by mixing the following components:
(A) 22.7 parts by weight of a solution of a condensation reaction product between the organopolysiloxane and an organopolysiloxane resin obtained in the aforementioned Synthesis Example;
(B) 1.2 parts by weight of a methylhydrogen/dimethylpolysiloxane copolymer (content of silicon-bonded hydrogen atoms=1.0 wt. %) having both molecular terminals capped with trimethylsiloxy groups, which viscosity is 55 mPa·s, and represented by the average structural formula given below:

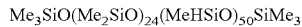
Me$_3$SiO(Me$_2$SiO)$_{24}$(MeHSiO)$_{50}$SiMe$_3$ (C) 31.8 parts by weight of a diorganopolysiloxane (average molecular weight=300,000; vinyl %=0.06), which is shown by the average structural formula given below:

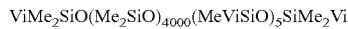
ViMe$_2$SiO(Me$_2$SiO)$_{4000}$(MeViSiO)$_5$SiMe$_2$Vi (D) 20.0 parts by weight of a toluene solution with 68.1 parts by weight of a solid substance of an organopolysiloxane resin, which mole ratio of Me$_3$SiO$_{1/2}$ units to SiO$_{4/2}$ is equal to 0.8/1, and shown by the average structural formula given below:

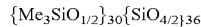
{Me$_3$SiO$_{1/2}$}$_{30}${SiO$_{4/2}$}$_{36}$ (E) a chloroplatinic-acid complex of 1,3-divinyl-1,1,3,3-tetramethyldisiloxane used in an amount such that in terms of weight units the content of a metallic platinum in the complex is 100 ppm per total weight of components (A) through (D);
0.2 parts by weight of 1-ethynyl-1-cyclohexanol;
0.95 parts by weight of xylene; and
74.3 parts by weight of toluene.

The obtained silicone-based pressure-sensitive adhesive agent P1 was used for preparing an adhesive tape. The adhesive force and silicone-transfer properties of this adhesive tape were evaluated by the same method as described above.

Reference Example

A mixture solution containing a 40% volatile component (hereinafter Component (A1)) was obtained by mixing the following constituents in 450 mL glass pot for 6 hours at room temperature:
(a) 84 g of diorganopolysiloxane (average molecular weight=300,000; and vinyl-group content=0.08 wt. %) having silanol (OH) groups in both molecular terminals and silicon-bonded vinyl groups in side chains, which is shown by the below average structural formula:

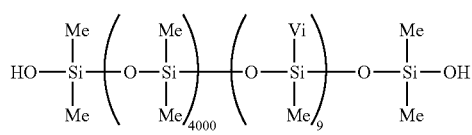

(b) 49.2 g of a toluene solution with 73.1 parts by weight of a solid substance of an organopolysiloxane resin (average molecular weight=4605; and OH-group content=1.11 wt. %)

consisting of Me$_3$SiO$_{1/2}$ units, HOMe$_2$SiO$_{1/2}$ units, and SiO$_{4/2}$ units, which is shown by the below average structural formula:

{Me$_3$SiO$_{1/2}$}$_{27}${HOMe$_2$SiO$_{1/2}$}$_3${SiO$_{4/2}$}$_{36}$ 6.13 g of xylene; and
160.6 g of toluene.

Comparative Example 1

A silicone-based pressure-sensitive adhesive composition C1 with 33 wt. % content of the organopolysiloxane component was obtained by the same method as in Practical Example 1, with the exception that component (A1) of only a mixture solution was used instead of component (A) of Practical Example 1. The obtained silicone-based pressure-sensitive adhesive composition C1 was used for preparing an adhesive tape. The adhesive force and silicone-transfer properties of this adhesive tape were evaluated by the same method as described above.

Comparative Example 2

A silicone-based pressure-sensitive adhesive composition C2 with a 33 wt. % organopolysiloxane component was prepared by mixing the following components:
(A) 20.0 parts by weight of a solution of a condensation reaction product between the organopolysiloxane and an organopolysiloxane resin obtained in the aforementioned Synthesis Example;
(B) 1.2 parts by weight of a methylhydrogen/dimethylpolysiloxane copolymer (content of silicon-bonded hydrogen atoms=1.0 wt. %) having both molecular terminals capped with trimethylsiloxy groups, which viscosity is 55 mPa·s, and represented by the average structural formula given below:

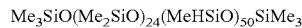
Me$_3$SiO(Me$_2$SiO)$_{24}$(MeHSiO)$_{50}$SiMe$_3$ (C) 31.8 parts by weight of a diorganopolysiloxane (average molecular weight=300,000; vinyl %=0.06), which is shown by the average structural formula given below:
ViMe$_2$SiO(Me$_2$SiO)$_{4000}$(MeViSiO)$_5$SiMe$_2$Vi

(E) a chloroplatinic-acid complex of 1,3-divinyl-1,1,3,3-tetramethyldisiloxane used in an amount such that in terms of weight units the content of a metallic platinum in the complex is 100 ppm per total weight of components (A) through (C);
0.2 parts by weight of 1-ethynyl-1-cyclohexanol; and
59.8 parts by weight of toluene.

The obtained silicone-based pressure-sensitive adhesive composition C2 was used for preparing an adhesive tape. The adhesive force and silicone-transfer properties of this adhesive tape were evaluated by the same method as described above.

Comparative Example 3

A silicone-based pressure-sensitive adhesive composition C3 with a 33 wt. % organopolysiloxane component was prepared by mixing the following components:
(B) 1.2 parts by weight of a methylhydrogen/dimethylpolysiloxane copolymer (content of silicon-bonded hydrogen atoms=1.0 wt. %) having both molecular terminals capped with trimethylsiloxy groups, which viscosity is 55 mPa·s, and represented by the average structural formula given below:

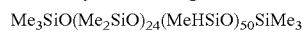
Me$_3$SiO(Me$_2$SiO)$_{24}$(MeHSiO)$_{50}$SiMe$_3$ (C) 31.8 parts by weight of a diorganopolysiloxane (average molecular weight=300,000; vinyl %=0.06), which is shown by the average structural formula given below:

ViMe$_2$SiO(Me$_2$SiO)$_{4000}$(MeViSiO)$_5$SiMe$_2$Vi (D) 20.0 parts by weight of a toluene solution with 68.1 parts by weight of a solid substance of an organopolysiloxane resin, which mole ratio of Me₃SiO₁/₂ units to SiO₄/₂ is equal to 0.8/1, and shown by the average structural formula given below:

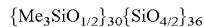
{Me₃SiO₁/₂}₃₀{SiO₄/₂}₃₆

(E) a chloroplatinic-acid complex of 1,3-divinyl-1,1,3,3-tetramethyldisiloxane used in an amount such that in terms of weight units the content of a metallic platinum in the complex is 100 ppm per total weight of components (B) through (D);
0.2 parts by weight of 1-ethynyl-1-cyclohexanol;
1.65 parts by weight of xylene; and
91.7 parts by weight of toluene.

The obtained silicone-based pressure-sensitive adhesive agent C3 was used for preparing an adhesive tape. The adhesive force and silicone-transfer properties of this adhesive tape were evaluated by the same method as described above.

Comparative Example 4

A silicone-based pressure-sensitive adhesive composition C4 with a 33 wt. % of organopolysiloxane component was prepared by mixing the following components:
(A) 125 parts by weight of a solution of a condensation reaction product between the organopolysiloxane and an organopolysiloxane resin obtained in the aforementioned Synthesis Example;
(B) 1.2 parts by weight of a methylhydrogen/dimethylpolysiloxane copolymer (content of silicon-bonded hydrogen atoms=1.0 wt. %) having both molecular terminals capped with trimethylsiloxy groups, which viscosity is 55 mPa·s, and represented by the average structural formula given below:

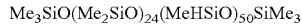
Me₃SiO(Me₂SiO)₂₄(MeHSiO)₅₀SiMe₃

(E) a chloroplatinic-acid complex of 1,3-divinyl-1,1,3,3-tetramethyldisiloxane used in an amount such that in terms of weight units the content of a metallic platinum in the complex is 100 ppm per total weight of components (A) through (D);
0.2 parts by weight of 1-ethynyl-1-cyclohexanol; and
25.0 parts by weight of toluene.

The obtained silicone-based pressure-sensitive adhesive agent C4 was used for preparing an adhesive tape. The adhesive force and silicone-transfer properties of this adhesive tape were evaluated by the same method as described above.

Results of the evaluation obtained in Practical Example 1 and in Comparative Examples 1 to 4 are shown in Table 1. Even when the silicone-based pressure-sensitive adhesive composition comprising components (A) through (E) of the invention (Practical Example 1) was used for heat-resistant applications, the composition provided sufficient adhesive force, did not change its appearance, could be peeled off without leaving an adhesive residue, and almost completely prevented its transfer of silicone component to the surface of the adherend. On the other hand, in the case of Comparative Example 1 wherein a pre-condensation mixture is used instead of a condensation reaction product, the appearance was changed to be turbid with aged time at 50° C. and it is impossible to completely prevent transfer of silicone component to the adherend. Furthermore, the composition that were prepared without one of the necessary components (A), (C), or (D) (Comparative Examples 2 to 4) either did not provide sufficient adhesive force or could not prevent transfer of the silicone component to the surface of the adherend.

TABLE 1

| | Practical Example 1 | Comparative Examples | | | |
|---|---|---|---|---|---|
| | | 1 | 2 | 3 | 4 |
| Adhesive force [g/20 mm] | 8 | 5.5 | 2 (1*) | 10 | 8.5 |
| Appearance of the silicone-based pressure-sensitive adhesive composition | ○ | X | ○ | X | ○ |
| Property of non-leaving and adhesive substance | Mirror-surface SUS Plate | ○ | ○ | ○ | ○ | ○ |
| | Gold-plated plate | ○ | ○ | ○ | Δ~X | ○ |
| Property of non-transfer of a silicone component | Mirror-surface SUS Plate | ○ | ○ | ○ | ○~Δ | ○ |
| | Gold-plated plate | ○ | Δ~X | ○ | X | Δ~X |

(*1) Since the adhesive force was too weak, a void could be seen with the mirror-surface SUS plate in the heat-treatment test.

The invention claimed is:

1. A silicone-based pressure-sensitive adhesive composition comprising components (A) through (E), wherein:
(A) is a condensation-reaction product obtained by subjecting constituents (a) and (b) given below to a condensation reaction in the presence of constituent (c), wherein:
constituent (a) is used in the amount of 10 parts by weight and comprises a diorganopolysiloxane having silanol groups on both molecular terminals and 2 or more silicon-bonded alkenyl groups located in side molecular chains on average in one molecule, represented by general formula (1):

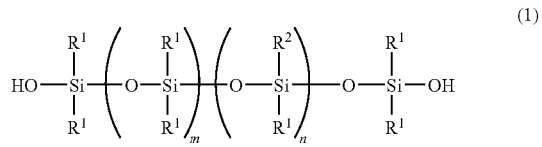

where R¹ designates a non-substituted or substituted monovalent saturated hydrocarbon group, R² designates an alkenyl group having 2 to 10 carbon atoms, "m" is an integer equal to or greater than 2000, and "n" is an integer equal to or greater than 2;
constituent (b) is used in the amount of 1 to 30 parts by weight and comprises an organopolysiloxane resin having one or more hydrolyzable groups in one molecule and consisting essentially of XR³₂SiO₁/₂ units, where X stands for an OH group and a hydrolyzable group selected from alkoxy groups having 2 to 6 carbon atoms, and R³ may independently designate non-substituted or substituted monovalent hydrocarbon groups having 1 to 10 carbon atoms, R³₃SiO₁/₂ units wherein R³ are the same as defined above, and SiO₄/₂ units;
constituent (c) is a condensation catalyst used in a catalytic quantity;

(B) is an organohydrogenpolysiloxane represented by the general formula (2):

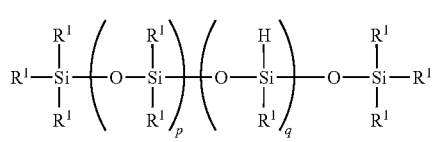

(2)

wherein $R^1$ designates a non-substituted or substituted saturated monovalent hydrocarbon group, "p" is a positive integer, "q" is an integer equal to or greater than 2, and where "p" and "q" satisfy the following condition: $10 \leq (p+q) \leq 200$;

(C) is a diorganopolysiloxane having silicon-bonded alkenyl groups on both molecular terminals, represented by the general formula (3):

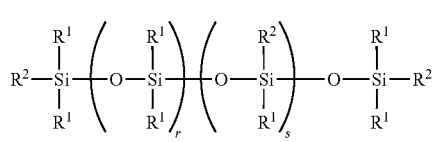

(3)

wherein $R^1$ designates a non-substituted or substituted saturated monovalent hydrocarbon group, $R^2$ designates an alkenyl group with 2 to 10 carbon atoms, "r" designates an integer equal to or greater than 2000, and "s" designates 0 or a positive integer;

(D) is an organopolysiloxane resin consisting essentially of $R^4{}_3SiO_{1/2}$ units, where $R^4$ designates a group selected from a non-substituted or substituted monovalent hydrocarbon group, an OH group, or an alkoxy group having 2 to 6 carbon atoms, and where 90% or more of groups designated by $R^4$ are non-substituted or substituted monovalent hydrocarbon groups having 1 to 10 carbon atoms, and $SiO_{4/2}$ units; and (E) is a platinum catalyst.

2. The silicone-based pressure-sensitive adhesive composition according to claim 1 wherein components (A) through (E) are used in the following amounts per 100 parts by weight of component (A):
   component (B): in the amount sufficient for providing 2 to 50 silicon-bonded hydrogen atoms per 1 silicon-bonded alkenyl group out of all silicon-bonded alkenyl groups present in the composition;
   component (C): in the amount of 400 to 2000 parts by weight;
   component (D): in the amount of 50 to 1000 parts by weight; and
   component (E): in the amount that in terms of weight units provides the content of metallic platinum in this component in the range 1 to 1000 ppm per total weight of components (A) through (D).

3. The silicone-based pressure-sensitive adhesive composition according to claim 2, wherein "m" and n" are numbers that further satisfy the following condition: $0.0002 \leq n/(m+n) \leq 0.02$ in constituent (a) represented by general formula (1).

4. The silicone-based pressure-sensitive adhesive composition according to claim 3, wherein "r" and "s" are numbers that further satisfy the following condition: $0.0002 \leq (s+2)/(r+s+2) \leq 0.02$ in component (C) represented by general formula (3).

5. The silicone-based pressure-sensitive adhesive composition according to claim 2, wherein "r" and "s" are numbers that further satisfy the following condition: $0.0002 \leq (s+2)/(r+s+2) \leq 0.02$ in component (C) represented by general formula (3).

6. The silicone-based pressure-sensitive adhesive composition according to claim 1 wherein "m" and n" are numbers that further satisfy the following condition:
   $0.0002 \leq n/(m+n) \leq 0.02$ in constituent (a) represented by general formula (1).

7. The silicone-based pressure-sensitive adhesive composition according to claim 1, wherein "r" and "s" are numbers that further satisfy the following condition:
   $0.0002 \leq (s+2)/(r+s+2) \leq 0.02$ in component (C) represented by general formula (3).

8. The silicone-based pressure-sensitive adhesive composition according to claim 1, wherein component (D) is an organopolysiloxane resin consisting essentially of $R^5{}_3SiO_{1/2}$ units, where $R^5$ designates an, alkyl group with 1 to 10 carbon atoms, and $SiO_{4/2}$ units and wherein the ratio of the $SiO_{4/2}$ units to $R^5{}_3SiO_{1/2}$ units is in the range of 0.6 to 1.0.

9. The silicone-based pressure-sensitive adhesive composition according to claim 1 further comprising an organic solvent (F).

10. An adhesive tape comprising a support film and a pressure-sensitive adhesive layer obtained by curing the silicone-based pressure-sensitive adhesive composition according to claim 1.

11. The adhesive tape according to claim 10, which is a masking tape for use in thermal treatment.

12. The adhesive tape according to claim 10, which is a masking tape for use in thermal treatment at temperatures in the range of 200 to 300° C.

* * * * *